(12) United States Patent
Moher et al.

(10) Patent No.: US 9,136,883 B1
(45) Date of Patent: Sep. 15, 2015

(54) ANALOG COMPENSATION CIRCUIT AND METHOD

(71) Applicant: Futurewei Technologies, Inc., Plano, TX (US)

(72) Inventors: Michael Moher, Stittsville (CA); James Gary Griffiths, Braeside (CA)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 14/464,137

(22) Filed: Aug. 20, 2014

(51) Int. Cl.
- *H04L 27/00* (2006.01)
- *H04B 1/00* (2006.01)
- *H04B 1/04* (2006.01)

(52) U.S. Cl.
CPC ............ *H04B 1/0042* (2013.01); *H04B 1/0475* (2013.01); *H04B 2001/0416* (2013.01); *H04B 2001/0491* (2013.01)

(58) Field of Classification Search
CPC ......... H04L 1/0001–1/0039; H04B 3/04–3/18; H04B 1/0475; H04B 1/62–1/64; H04B 1/00; H04B 1/0003; H04B 1/005; H04B 1/0458; H04B 1/72
See application file for complete search history.

(56) References Cited

U.S. PATENT DOCUMENTS

| 2014/0198688 A1* | 7/2014 | Li et al. | 370/278 |
| 2014/0348018 A1* | 11/2014 | Bharadia et al. | 370/252 |
| 2014/0355714 A1* | 12/2014 | Cheng et al. | 375/297 |

* cited by examiner

*Primary Examiner* — Dac Ha
(74) *Attorney, Agent, or Firm* — Slater & Matsil, L.L.P.

(57) ABSTRACT

Disclosed herein are an analog compensation circuit and a method for tuning an analog compensator in full-duplex transmission systems. An embodiment analog compensation circuit includes a secondary receiver configured to receive and convert a sampled self-interference signal to a baseband self-interference signal. A tuner is coupled to the secondary receiver and configured to receive a baseband transmit signal and the baseband self-interference signal, and to compute complex gains according to the baseband transmit signal and the baseband self-interference signal. An analog compensator is coupled to the tuner and has multiple branches. The analog compensator is configured to receive the complex gains and use them to adjust respective attenuators and phase shifters of the branches. The analog compensator is further configured to process a sample of a transmit signal using the branches, the transmit signal being up-converted from a new baseband transmit signal.

26 Claims, 5 Drawing Sheets

ANALOG COMPENSATION CIRCUIT AND METHOD

TECHNICAL FIELD

The present invention relates generally to a system and method for tuning an analog compensator, and, in particular embodiments, to an analog compensation circuit and method for tuning an analog compensator.

BACKGROUND

Many radio communication systems are configured to transmit and receive from the same antenna, because it is simply more efficient in some ways to use one antenna versus two. Further efficiencies are achievable if the transmission and reception can occur simultaneously on the same radio channel, which is often referred to as full-duplex transmission.

In full-duplex transmission, simultaneous transmission and reception may be carried out on a common frequency channel using a common antenna. One difficulty in full-duplex transmission is self-interference induced at the receiver by a transmitted signal. A typical approach to mitigating the self-interference is to use interference cancellation of the known transmitted signal. The interference cancellation is often accomplished in several stages, which can include passive analog cancellation, active analog cancellation, and digital cancellation.

SUMMARY OF THE INVENTION

Embodiments of the present invention provide an analog compensation circuit and a method of tuning an analog compensator for a full-duplex transmission system.

An embodiment analog compensation circuit includes a secondary receiver configured to receive and convert a sampled self-interference signal to a baseband self-interference signal. A tuner is coupled to the secondary receiver and configured to receive the baseband self-interference signal and a baseband transmit signal. The tuner is further configured to compute complex gains according to the baseband transmit signal and the baseband self-interference signal. An analog compensator is coupled to the tuner and has multiple branches. The analog compensator is configured to receive the complex gains and use them to adjust respective attenuators and phase shifters of the branches. The analog compensator is further configured to process a sample of the transmit signal using the plurality of branches. The transmit signal is up-converted from a new baseband transmit signal.

An embodiment method of tuning an analog compensation circuit for a full-duplex transceiver includes transmitting a transmit signal up-converted from a baseband transmit signal. A self-interference signal resulting from the transmitting is then received. The method then samples the self-interference signal in a time domain, thereby generating a sampled self-interference signal. The sampled self-interference signal is then converted to a digital baseband self-interference signal. The method also includes computing a plurality of complex gains in a frequency domain according to the digital baseband self-interference signal and the baseband transmit signal. The method further includes applying the plurality of complex gains to an analog compensator.

An embodiment full-duplex transceiver includes an isolation block, a transmit chain, and a receive chain. The first isolation block is coupled to a common antenna at a transmit port, and has an input port and an output port. The transmit chain is coupled to the input port of the isolation block and is configured to generate a baseband transmit signal that is up-converted to a transmit signal for transmission through the isolation block and the common antenna. The receive chain can receive a self-interference signal and includes a primary receive path, a secondary receiver, a tuner, and an analog compensator. The primary receive path is coupled to the output port of the isolation block. The secondary receiver is coupled to the primary receive path and configured to receive and convert a sampled self-interference signal to a baseband self-interference signal. The tuner is coupled to the secondary receiver and the transmit chain. The tuner is configured to receive the baseband transmit signal from the transmit chain and the baseband self-interference signal from the secondary receiver. The tuner is further configured to compute a plurality of complex gains according to the baseband transmit signal and the baseband self-interference signal. The analog compensator is coupled to the transmit chain, the tuner, and the primary receive path. The analog compensator includes a plurality of branches. The analog compensator is configured to receive the plurality of complex gains from the tuner and adjust respective attenuators and phase shifters of the plurality of branches using the plurality of complex gains. The analog compensator is further configured to process a sample of another transmit signal from the transmit chain using the plurality of branches to yield a compensation signal for coupling into the primary receive path.

An embodiment analog compensation circuit for a multi-transmitter full-duplex transceiver having N transmitters and N transmit chains includes a secondary receiver, a tuner, and an analog compensator. The secondary receiver is configured to receive and convert N samples of an aggregate self-interference signal to N baseband self-interference signal samples. The tuner is coupled to the secondary receiver and is configured to receive N baseband transmit signal samples from each of the N transmit chains, a total of N×N baseband transmit signal samples being received. The tuner is also configured to compute a plurality of complex gains according to the N×N baseband transmit signal samples and the N baseband self-interference signal samples. The analog compensator is coupled to the tuner and has a plurality of branches. The analog compensator is configured to receive the plurality of complex gains and adjust respective attenuators and phase shifters of the plurality of branches using the plurality of complex gains. The analog compensator is further configured to process respective samples of N transmit signals from the N transmit chains using the plurality of branches. The N transmit signals are respectively up-converted from N baseband transmit signals.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, the present invention provides many applications and inventive concepts that may be embodied in a wide variety of specific contexts. The specific embodiments discussed herein are merely illustrative of specific ways to make and use the invention, and do not limit the scope of the invention.

The first stage of self-interference cancellation is typically in the analog domain to prevent overloading of digital components and the receiver. Analog cancellation of self-interference can be performed by an analog compensator. The analog compensator applies a complex gain to the known signal, which is transmitted via a common antenna, and the resulting signal is subtracted from a signal received via the common antenna. The analog compensator generally includes an attenuator, a phase shifter, and a time delay. In certain embodiments of the analog compensator, multiple parallel branches of the attenuator, phase shifter, and time delay are present. For the purpose of tuning the analog compensator, voltage-controlled attenuators and voltage-controlled phase shifters are often used. Adjustable time delays are also possible.

The multiple branches of the voltage-controlled components provide a level of precision that can vary from system to system. Tuning of the analog compensator is typically done by manually adjusting the various attenuators and phase shifters. It is realized herein that automatic tuning of the analog compensator can be accomplished by computing the complex gains according to a sampled received signal and the known transmitted signal.

Figure 1:
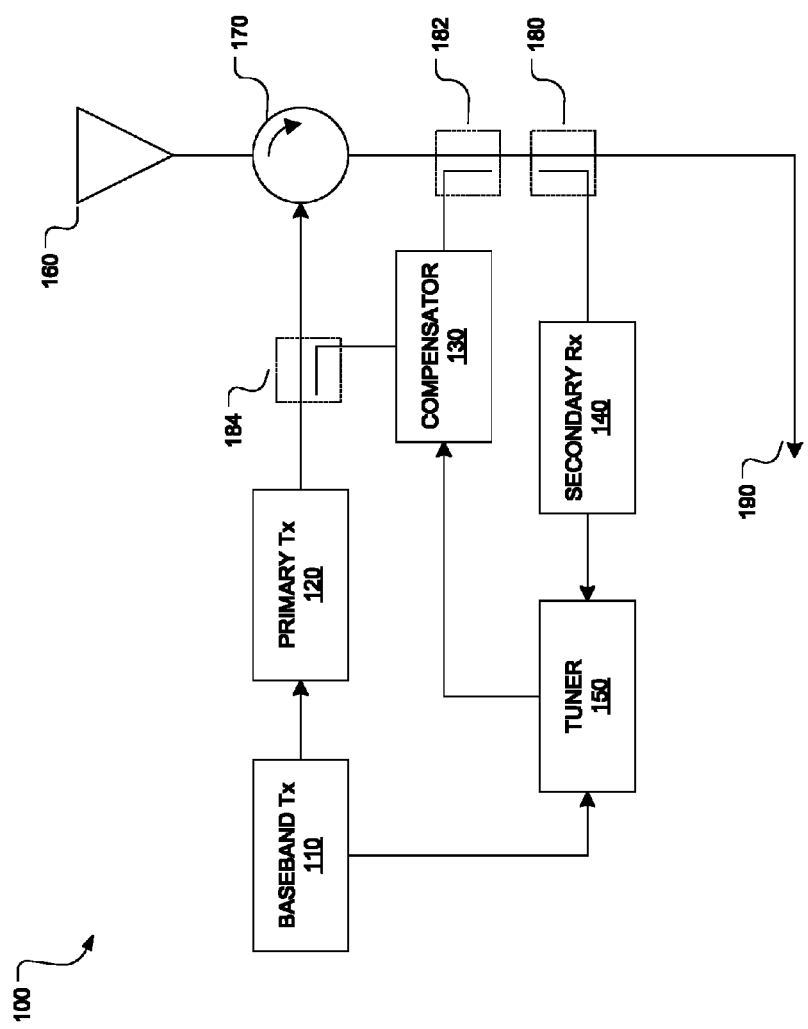
FIG. 1 is a functional block diagram of one embodiment of a full-duplex transceiver.

FIG. 1 is a functional block diagram of a full-duplex transceiver 100 within which the analog compensator tuning module and the method of tuning an analog compensator introduced herein may be embodied or carried out. Full-duplex transceiver 100 includes a baseband transmitter (Tx) 110, a primary Tx 120, an analog compensator 130, a secondary receiver (Rx) 140, a tuner 150, an antenna 160, a circulator 170, and couplers 180, 182, and 184.

In a transmission chain of full-duplex transceiver 100, baseband Tx 110 generates a baseband signal for estimating the channel, m(t) in the time domain and M(f) in the frequency domain, that is up-converted to a transmission frequency for the full-duplex radio channel by primary Tx 120. Circulator 170 separates the transmitted signal, r(t) in the time domain and R(f) in the frequency domain, via antenna 160 from a received signal, received via antenna 160. There are generally two major sources of reflection of the transmitted signal, and many other minor sources. The first major source of reflection is internal to circulator 170 due to impedance mismatching between a transmit port of circulator 170 and subsequent transmission lines, i.e., cabling or waveguides. Circulator 170 functions as an isolation block and is a typical implementation of the isolation block in radio frequency (RF) systems, although other implementations are possible. Ideally, the isolation block isolates, or rejects, the transmitted signal from the received signal; however, this rejection is never perfect and results in self-interference. The second major source of reflection is at antenna 160, again due to impedance mismatching. These reflections are typically the largest contributors of self-interference. Self-interference cancellation approximates the reflections and subtract them from the received signal. Self-interference is represented by the following equation:

$$s(t) = \alpha_1 r(t-\tau_1) + \alpha_2 r(t-\tau_2),$$

where $\alpha_1$ and $\alpha_2$ are respective complex gains for the two reflected paths, each having an attenuation component and a phase component, and $\tau_1$ and $\tau_2$ are respective time delays for the two reflected paths. In the frequency domain, self-interference is represented by the following equation, which is the Fourier transform of s(t):

$$S(f) = \alpha_1 e^{j2\pi f \tau_1} R(f) + \alpha_2 e^{j2\pi f \tau_2} R(f), \text{ or}$$

$$S(f) = H(f) R(f),$$

where H(f) represents the linear combination of all reflections into a single transfer function and represents an equivalent channel from baseband Tx 110 to coupler 180, including all reflections.

In a receive chain of full-duplex transceiver 100, secondary Rx 140 receives a sample of the received signal, which includes the self-interference, s(t), via coupler 180. The received signal is sampled in the time domain. Secondary Rx 140 down-converts the sampled signal to baseband and converts it from analog to digital. The digital sampled baseband signal is passed to tuner 150, along with the known baseband signal from baseband Tx 110.

Tuner 150 computes complex gains for compensator 130 in the frequency domain based on the digital sampled baseband signal, S(f), from secondary Rx 140 and the known baseband signal, M(f), from baseband Tx 110. In embodiments employing orthogonal frequency division multiplexing (OFDM), the conversion from time domain to frequency domain can be made efficiently using a fast Fourier transform (FFT). Compensator 130 aims to approximate the equivalent channel, H(f), and derive the complex gains from the equation $$\hat{H}(f) = \frac{S(f)}{R(f)},$$

where $\hat{H}(f)$ is an estimate of the equivalent channel H(f). Compensator 130 assumes the response of primary Tx 120 is 1, therefore allowing the use of M(f) for R (f).

Compensator 130 uses the complex gains from tuner 150 to process another transmitted signal, which is sampled via coupler 184. The processed signal is then added to the received signal via coupler 182, thereby cancelling at least a portion of the self-interference induced on the receive chain by the transmit chain. A compensated received signal 190 propagates further down the receive chain, possibly to additional cancellation stages and a primary Rx.

Figure 2:
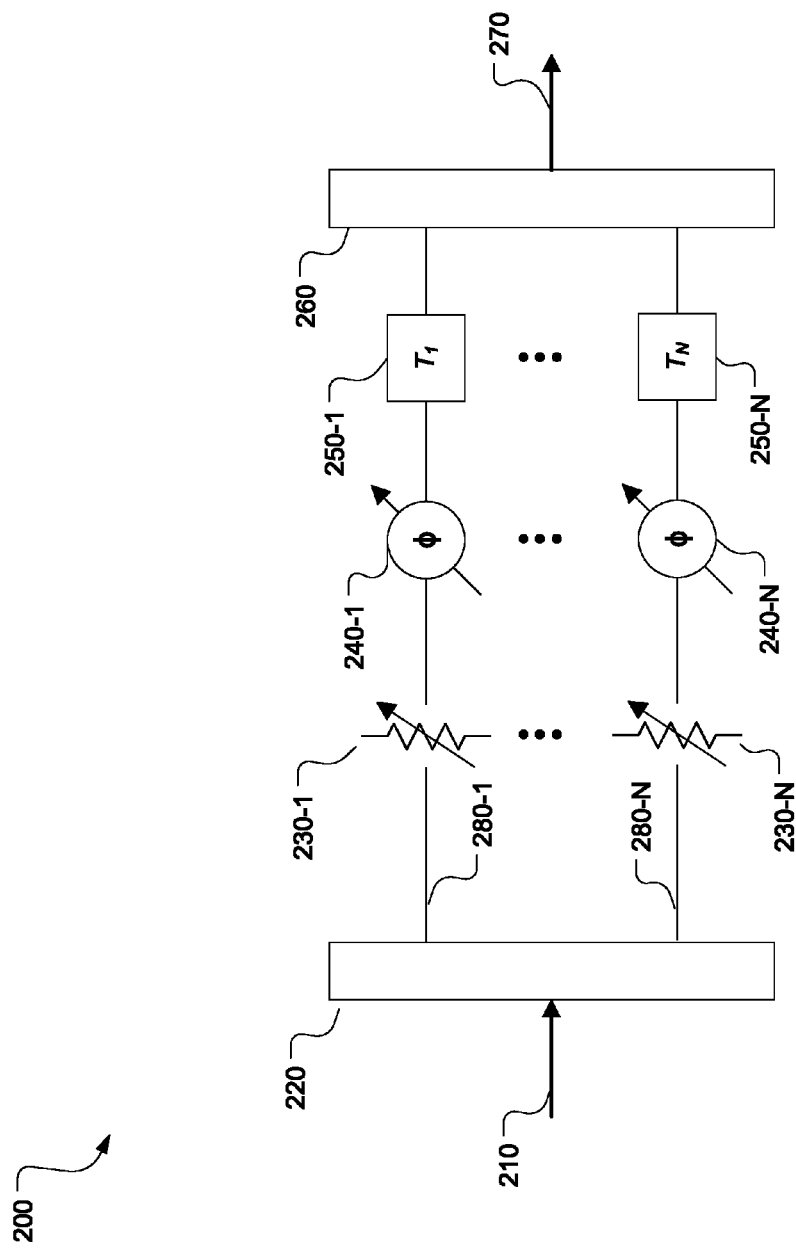
FIG. 2 is a functional block diagram of one embodiment of an analog compensator.

FIG. 2 is a functional block diagram of one embodiment 200 of analog compensator 130 of FIG. 1. Analog compensator 200 includes a power splitter 220 that evenly splits an input signal 210 into branches 280-1 through 280-N, forming a compensator network. The N branches are combined at a power combiner 260 into an output signal 270. Each branch includes a voltage-controlled attenuator, a voltage-controlled phase shifter, and a fixed time delay. For example, an $n^{th}$ branch, branch 280-n, includes a voltage-controlled attenuator 230-n, a voltage-controlled phase shifter 240-n, and a time delay 250-n having a delay of $T_n$ seconds.

The $i^{th}$ branch of analog compensator 200 is modeled as $C_i(f) = \beta_i U_i(f)$, where $\beta_i$ is a complex gain for the $i^{th}$ branch, and $U_i(f)$ is a frequency-dependent transfer function for the $i^{th}$ branch. The discrete frequency response for each branch, $u_i$, can be measured offline, i.e., lab testing. The frequencies used to measure the frequency response of analog compensator 200 are $f_i = \{f_1, f_2, \ldots, f_K\}$. These discrete frequencies are typically non-zero subcarriers of the known transmitted signal, R(f). Therefore, $u_i$ is represented by $$u_i = \begin{bmatrix} U_i(f_1) \\ U_i(f_2) \\ \vdots \\ U_i(f_K) \end{bmatrix}.$$

Likewise, the discrete frequency response of H(f) is h, represented by $$h = \begin{bmatrix} H(f_1) \\ H(f_2) \\ \vdots \\ H(f_K) \end{bmatrix},$$

where $$H(f_i) = \frac{S(f_i)}{R(f_i)}$$

and the complex gains are represented by $$\beta = \begin{bmatrix} \beta_1 \\ \beta_2 \\ \vdots \\ \beta_K \end{bmatrix}.$$

Returning now to tuner 150 of FIG. 1, tuner 150 is a digital device, such as a microprocessor, e.g., a general purpose microprocessor, a digital signal processor, an application specific integrated circuit, dedicated circuitry, or the like. Tuner 150 computes the complex gains, β, by solving the following system using a least squares technique:

$$u\beta = h, \text{ or}$$

$$[u_1 \quad u_2 \quad \ldots \quad u_K] \begin{bmatrix} \beta_1 \\ \beta_2 \\ \vdots \\ \beta_K \end{bmatrix} = \begin{bmatrix} \frac{S(f_1)}{R(f_1)} \\ \frac{S(f_2)}{R(f_2)} \\ \vdots \\ \frac{S(f_K)}{R(f_K)} \end{bmatrix}.$$

The system is often over-determined, allowing it to be solved via a Moore-Penrose inverse or a singular-value decomposition. Each complex gain, $\beta_i$, is converted to a voltage signal to control the respective attenuator and phase shifter for the $i^{th}$ branch.

In alternative embodiments, tuner 150 mitigates distortions, other than reflections caused by circulator 170 and antenna 160, that may occur on the channel, H(f). The transmitted signal, or the signal that is reflected, R(f), is a composition of the response of primary Tx 120 on the baseband signal, M(f). The response of primary Tx 120 is referred to as $H_0(f)$. The self-interference signal is a composition of the response of secondary Rx 140 on the reflected signal, R(f). The response of secondary Rx 140 is referred to as $H_1(f)$. Accordingly, $$R(f) = H_0(f)M(f), \text{ and}$$

$$S(f) = H_1(f)H(f)R(f).$$

The baseband signal, M(f), is known, not the transmitted signal. It follows that the estimate of the equivalent channel is actually given by the equation below, contrary to the assumption of $H_0(f) = 1$ above.

$$\hat{H}(f) = \frac{S(f)}{M(f)} = \frac{H_1(f)H(f)H_0(f)M(f)}{M(f)}$$

$$= H_1(f)H(f)H_0(f)$$

If the responses for primary Tx 120 and secondary Rx 140 are distortion-less, or equal to one, then the estimate above is without error. Otherwise, tuner 150 can compensate for unknown distortions induced by other components, such as primary Tx 120 and secondary Rx 140. In alternative embodiments, tuner 150 operates initially as described above, computing the complex gains using a least-squares technique. On subsequent iterations, to account for unknown distortions, a binary search is performed around initial estimates for the complex gains. One gain at a time is modified to determine if the varying gain further reduces the self-interference power measured by secondary Rx 140. The modification can be kept or reversed, depending on the measured power.

Figure 3:
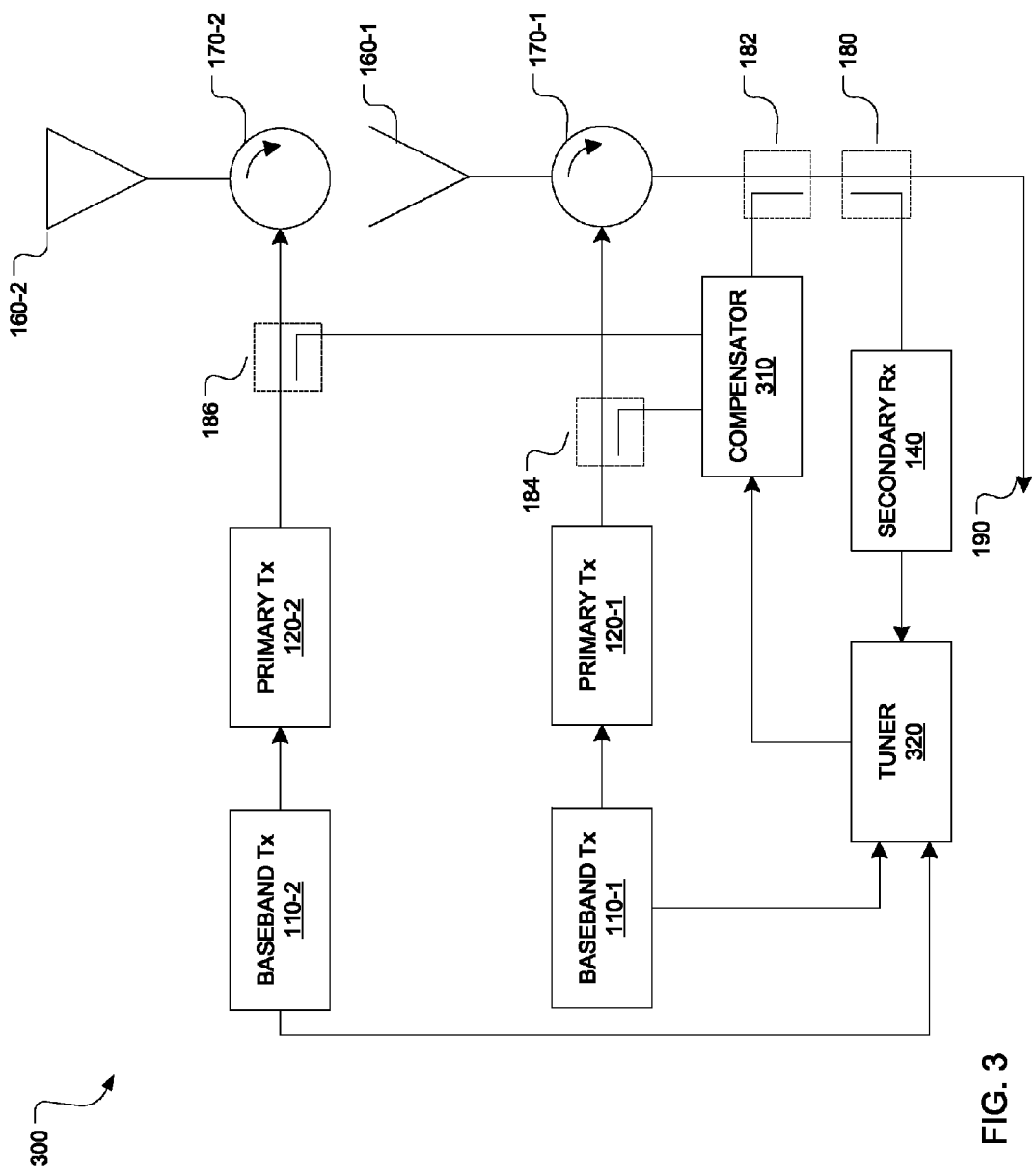
FIG. 3 is a functional block diagram of one embodiment of a multi-transmitter full-duplex transceiver.

In alternative embodiments, tuner 150 and analog compensator 130 are expanded for multi-input multi-output (MIMO) systems. FIG. 3 is a functional block diagram of one embodiment of a two-transmitter full-duplex transceiver 300, which is an example of a MIMO system. Transceiver 300 is similar to transceiver 100, but with several distinctions. Transceiver 300 includes two transmit chains. Additionally, transceiver 300 includes a compensator 310 and a tuner 320, which are slightly different to accommodate the multiple transmitters. The relevant components of the first transmit chain include baseband Tx 110-1 and primary Tx 120-2, which transmits through a circulator 170-1 and an antenna 160-1. The relevant components of the second transmit chain include a baseband Tx 110-2 and primary Tx 120-2, which transmits through a circulator 170-2 and an antenna 160-2. The second transmit chain is coupled to compensator 310 via a coupler 186. Self-interference is received at secondary Rx 140, as in the embodiment of FIG. 1, due to reflections from circulator 170-1 and antenna 160-1. Additionally, there is coupling between antenna 160-2 and antenna 160-1, which introduces power transmitted from the second transmit chain through antenna 160-2 into the receive chain. The frequency domain representation of self-interference signal is represented by the following equation:

$$S(f) = H_{11}(f)M_1(f) + H_{12}(f)M_2(f),$$

where, $H_{11}$ is the transfer function for the equivalent channel between primary Tx 120-1 and secondary Rx 140, $H_{12}$ is the transfer function for the equivalent channel between primary Tx 120-2 and secondary Rx 140, $M_1(f)$ is the frequency domain representation of the baseband signal generated by baseband Tx 110-1 in the first transmit chain, and $M_2(f)$ is the frequency domain representation of the baseband signal generated by baseband Tx 110-2 in the second transmit chain.

Figure 4:
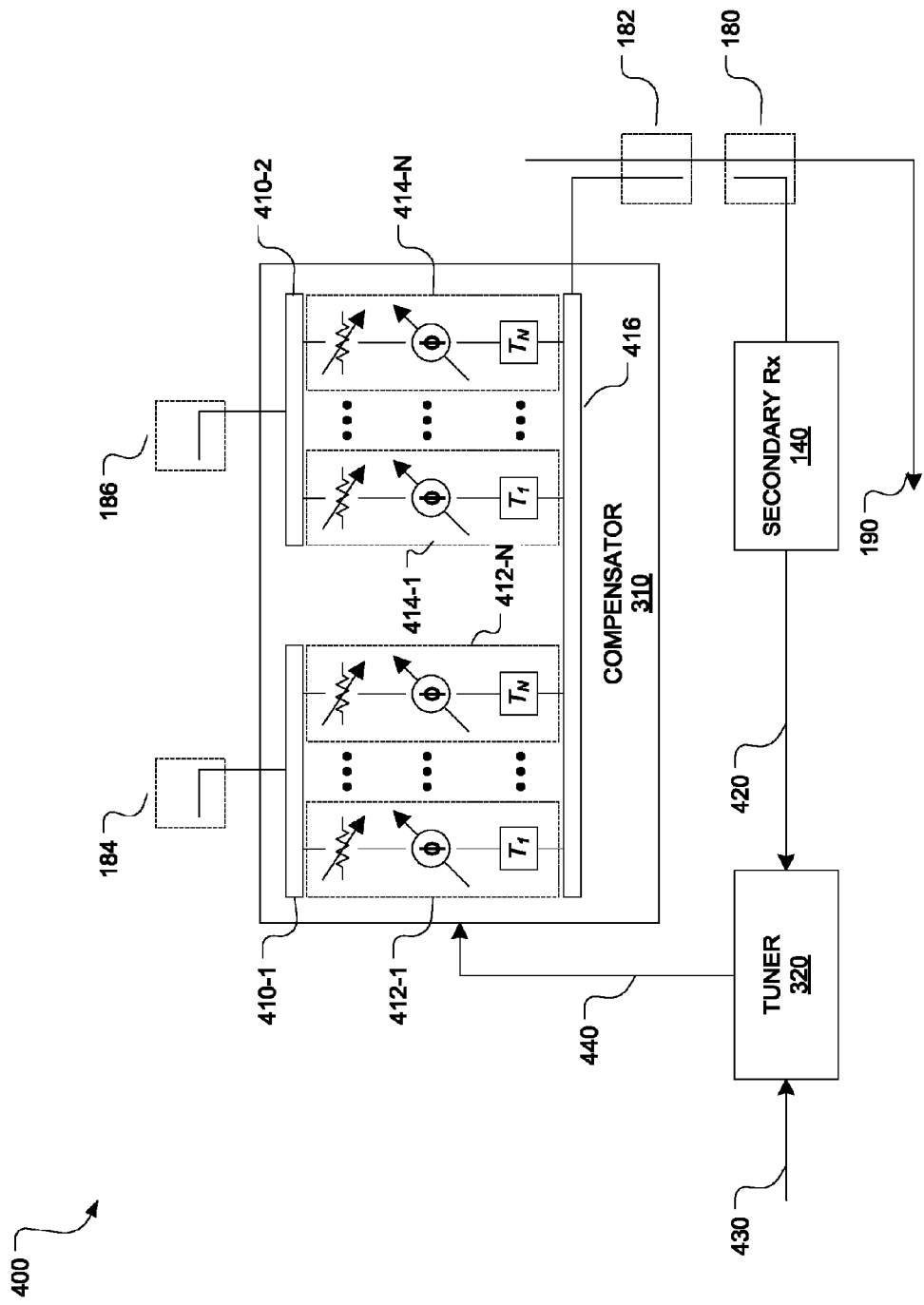
FIG. 4 is a functional block diagram of one embodiment of a compensation circuit for a multi-transmitter full-duplex transceiver.

FIG. 4 is a functional block diagram of one embodiment of a compensation circuit 400 for a multi-transmitter full-duplex transceiver, such as the transceiver embodiment of FIG. 3. Compensation circuit 400 includes secondary Rx 140, tuner 320, and compensator 310, all of FIG. 3. Compensation circuit 400 also includes couplers 180, 182, 184, and 186. Coupler 184 couples to the first transmit chain and samples the transmit signal for processing by a first set of N branches, branch 412-1 through branch 412-N. A first power splitter 410-1 splits the sampled transmit signal into the N branches, each branch having a voltage-controlled attenuator, a voltage-controlled phase shifter, and a fixed time delay. Similarly, coupler 186 couples to the second transmit chain and samples the transmit signal for processing by a second set of N branches, branch 414-1 through branch 414-N. A second power splitter 410-2 splits the sampled transmit signal into the N branches. A power combiner 416 combines the processed signal from the first and second sets of branches to form a single compensation signal that is coupled into the receive chain via coupler 182.

The self-interference signal is sampled in the time domain by coupler 182, and down-converted to baseband and converted to digital by secondary Rx 140. A baseband self-interference signal 420, s(t), is passed along to tuner 320. Baseband self-interference signal 420 is a digital baseband representation of the self-interference signal. Tuner 320 converts the time domain self-interference signal to the frequency domain representation, S(f), via a Fourier transform.

For a single transmitter, the system, $M(f)H(f)=S(f)$, is solved by transmission of a single OFDM symbol or equivalent, represented by the baseband signal M(f), over the equivalent channel and a division of the measured self-interference by the baseband signal. For a multi-transmitter, or a multiple input multiple output (MIMO) system, multiple symbols are transmitted and multiple self-interference measurements made to form the system. In the embodiment of FIG. 4, the first symbol transmitted by the respective transmit chains is given by $M_1^1(f)$ for the first transmit chain and $M_2^1(f)$ for the second transmit chain. The second symbol transmitted by the respective transmit chains is given by $M_1^2(f)$ for the first transmit chain and $M_2^2(f)$ for the second transmit chain. The baseband signals 430 are provided to tuner 320. Given the equation above for the self-interference signal, S(f), the system is expressed as:

$$\begin{bmatrix} M_1^1(f) & M_2^1(f) \\ M_1^2(f) & M_2^2(f) \end{bmatrix} \begin{bmatrix} H_{11}(f) \\ H_{12}(f) \end{bmatrix} = \begin{bmatrix} S^1(f) \\ S^2(f) \end{bmatrix}.$$

A discrete representation of the system, over a set of K frequency samples, $f=\{f_1, f_2, \ldots, f_K\}$, for the embodiment of FIG. 4 is written as follows:

$$\begin{bmatrix} \begin{bmatrix} M_1^1(f_1) & & \\ & \ddots & \\ & & M_1^1(f_K) \end{bmatrix} & \begin{bmatrix} M_2^1(f_1) & & \\ & \ddots & \\ & & M_2^1(f_K) \end{bmatrix} \\ \begin{bmatrix} M_1^2(f_1) & & \\ & \ddots & \\ & & M_1^2(f_K) \end{bmatrix} & \begin{bmatrix} M_2^2(f_1) & & \\ & \ddots & \\ & & M_2^2(f_K) \end{bmatrix} \end{bmatrix} \begin{bmatrix} H_{11}(f) \\ H_{12}(f) \end{bmatrix} = \begin{bmatrix} S^1(f) \\ S^2(f) \end{bmatrix}.$$

The system above can be solved for $H_{11}(f)$ and $H_{12}(f)$. In the embodiment of FIG. 4, a first set of complex gains, $\beta_{11}$, controls branches 412-1 through 412-N of compensator 310, and a second set of complex gains, $\beta_{12}$, control branches 414-1 through 414-N. The first set of complex gains are computed by solving the system given by the transfer function, $u_{11}$, for branches 412-1 through 412-N, given $H_{11}(f)$. The system is expressed as follows:

$$u_{11}\beta_{11} = H_{11}.$$

Likewise, the second set of complex gains are computed by solving the system given by the transfer function, $u_{12}$, for branches 414-1 through 414-N, given $H_{12}(f)$. The system is expressed as follows:

$$u_{12}\beta_{12} = H_{12}.$$

Complex gains $\beta_{11}$ and $\beta_{12}$ 440 are then passed to compensator 310.

Certain embodiments utilize a training interval within which the two transmitters alternately transmit a symbol while the other transmits nothing. The system described above applies, however $M_2^1(f)$ and $M_1^2(f)$ are zero, making the system simpler to solve.

Figure 5:
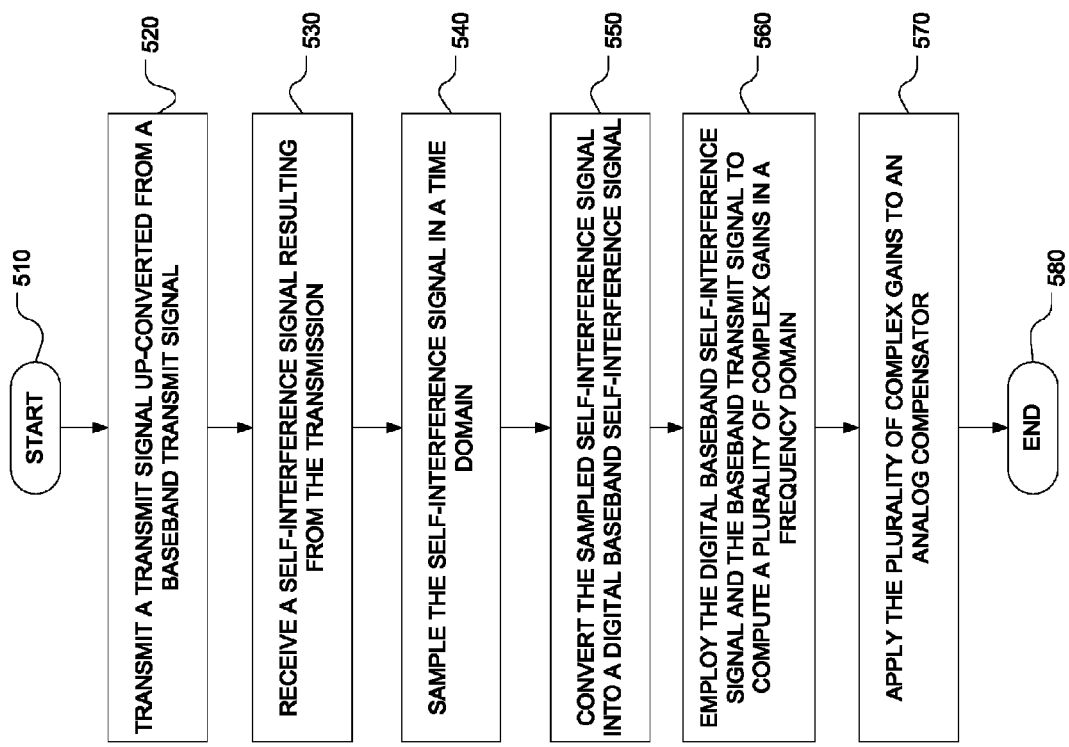
FIG. 5 is a flow diagram of one embodiment of a method of tuning an analog compensator for a full-duplex transceiver.

FIG. 5 is a flow diagram of one embodiment of a method of tuning an analog compensator for a full-duplex transceiver. The method begins at a start step 510. At a transmit step 520, a transmit signal up-converted from a baseband transmit signal is transmitted. The transmission is made through a transmit chain, which typically includes a baseband transmitter for generating the baseband signal and a primary transmitter for up-converting. The transmission is made through an isolation block and a common antenna. The common antenna also receives signals over the same frequency channel. The isolation block separates the transmit signal from the received signal. When tuning the analog compensator, the transmit signal is a test signal and the received signal is a self-interference signal.

The self-interference signal is received at a receive step 530. The self-interference signal is a result of the transmission in transmit step 520, generally due to reflections at the isolation block and the common antenna. At a first sampling step 540, the self-interference signal is sampled in the time domain. Sampling can be performed via a coupler along the primary receive path. The sampled self-interference signal is then converted to a digital baseband self-interference signal, which is a digital representation of the self-interference, at a conversion step 550. This down-conversion is generally carried out by a secondary receiver.

The digital baseband self-interference signal and the baseband transmit signal are employed at a computing step 560 by a tuner. The tuner uses the two signals to compute a plurality of complex gains. The computations are performed in the frequency domain. The tuner can convert the time domain baseband transmit signal and the time domain digital baseband self-interference signal using a Fourier transform. In certain embodiments, the conversion can be done via a fast Fourier transform (FFT) using a set of K frequencies, $f=\{f_1, f_2, \ldots, f_K\}$.

The plurality of complex gains computed at computing step 560 are applied at a tuning step 570. Each complex gain in the plurality is translated into a control signal for respective attenuators, phase shifters, and, in certain embodiments, time delays for a plurality of branches in the analog compensator. In certain embodiments, the attenuators and phase shifters are voltage-controlled. In alternative embodiments, the attenuators and phase shifters are digitally controlled. The tuned analog compensator can then be used to process a transmit signal, thereby generating a compensation signal that can be coupled into the primary receive path. The method then ends at a step 580.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An analog compensation circuit for a full-duplex transceiver, comprising:
   a secondary receiver configured to receive and convert a sampled self-interference signal to a baseband self-interference signal;
   a tuner coupled to the secondary receiver and configured to:
      receive the baseband self-interference signal,
      receive a baseband transmit signal, and
      compute a plurality of complex gains according to the baseband transmit signal and the baseband self-interference signal; and
   an analog compensator coupled to the tuner, having a plurality of branches, and configured to:
      receive the plurality of complex gains,
      adjust respective attenuators and phase shifters in the plurality of branches using the plurality of complex gains, and
      process a sample of a transmit signal using the plurality of branches, wherein the transmit signal is up-converted from a new baseband transmit signal.

2. The analog compensation circuit of claim 1 wherein the analog compensator includes the plurality of branches coupled in parallel between a power splitter and a power combiner, wherein each of the plurality of branches includes a voltage-controlled attenuator, a voltage-controlled phase shifter, and a fixed time delay, and wherein the analog compensator is configured to apply the plurality of complex gains to control respective voltage-controlled attenuators and voltage-controlled phase-shifters of the plurality of branches.

3. The analog compensation circuit of claim 1 wherein each branch of the analog compensator is modeled by a respective transfer function, U(f), to which a respective complex gain, β, of the plurality of complex gains, is applied.

4. The analog compensation circuit of claim 3 wherein the respective transfer function, U(f), is determined empirically.

5. The analog compensation circuit of claim 3 wherein the tuner is configured to employ a least square technique to solve a system, formed by the plurality of branches of the analog compensator, for the plurality of complex gains in a frequency domain, wherein the system is of a form uβ=h, wherein u is a discrete representation in the frequency domain of respective transfer functions for the plurality of branches, β is the plurality of complex gains, and h is a discrete representation in the frequency domain of a quotient of the baseband self-interference signal divided by the baseband transmit signal.

6. The analog compensation circuit of claim 5 wherein:
   the plurality of complex gains includes N complex gains;
   the plurality of branches includes N branches; and
   the tuner is configured to use a set of K frequencies to form u and h.

7. The analog compensation circuit of claim 6 wherein the transmit signal is an orthogonal frequency division multiplexed (OFDM) signal and the set of K frequencies includes subcarrier frequencies of the transmit signal.

8. The analog compensation circuit of claim 1 wherein the tuner is configured to convert the baseband transmit signal and the baseband self-interference signal from a time domain to a frequency domain.

9. The analog compensation circuit of claim 1 wherein the tuner comprises a processor.

10. A method of tuning an analog compensation circuit for a full-duplex transceiver, comprising:
    transmitting a transmit signal up-converted from a baseband transmit signal;
    receiving a self-interference signal resulting from the transmitting;
    sampling the self-interference signal in a time domain, thereby generating a sampled self-interference signal;
    converting the sampled self-interference signal into a digital baseband self-interference signal;
    computing a plurality of complex gains in a frequency domain according to the digital baseband self-interference signal and the baseband transmit signal; and
    applying the plurality of complex gains to an analog compensator.

11. The method of claim 10 further comprising processing another transmit signal using the analog compensator to generate a compensation signal.

12. The method of claim 10 wherein the computing the plurality of complex gains includes converting the digital baseband self-interference signal and the baseband transmit signal from the time domain to the frequency domain using a fast Fourier transform (FFT).

13. The method of claim 10 wherein the computing the plurality of complex gains includes representing the analog compensator as a system of frequency dependent transfer functions to which the plurality of complex gains are applied.

14. The method of claim 13 wherein the computing the plurality of complex gains includes:
    equating the system of frequency dependent transfer functions to a quotient of the digital baseband self-interference signal divided by the baseband transmit signal; and
    solving the system for the plurality of complex gains using a least square technique.

15. The method of claim 10 wherein the applying includes translating each of the plurality of complex gains into at least one respective voltage for adjusting respective voltage-controlled attenuators and voltage controlled phase shifters.

16. The method of claim 10 further comprising iteratively varying one of the plurality of complex gains by a small amplitude do determine if the self-interference signal can be further reduced in power.

17. A full-duplex transceiver, comprising:
    an isolation block coupled to a common antenna at a transmit port, and having an input port and an output port;
    a transmit chain coupled to the input port of the isolation block and configured to generate a baseband transmit signal that is up-converted to a transmit signal for transmission through the isolation block and the common antenna; and
    a receive chain, through which a self-interference signal is receivable, having:
        a primary receive path coupled to the output port of the isolation block,
        a secondary receiver coupled to the primary receive path and configured to receive and convert a sampled self-interference signal to a baseband self-interference signal,
        a tuner coupled to the secondary receiver and the transmit chain, and configured to:

receive the baseband transmit signal from the transmit chain, and compute a plurality of complex gains according to the baseband transmit signal and the baseband self-interference signal, and an analog compensator coupled to the transmit chain, the tuner, and the primary receive path, having a plurality of branches, and configured to:

receive the plurality of complex gains from the tuner, adjust respective attenuators and phase shifters of the plurality of branches using the plurality of complex gains, and process a sample of another transmit signal from the transmit chain using the plurality of branches to yield a compensation signal for coupling into the primary receive path.

18. The full-duplex transceiver of claim 17 wherein the analog compensator includes the plurality of branches coupled in parallel between a power splitter and a power combiner, wherein each of the plurality of branches includes a voltage-controlled attenuator, a voltage-controlled phase shifter, and a fixed time delay, and wherein the analog compensator is configured to apply the plurality of complex gains to control respective voltage-controlled attenuators and voltage-controlled phase-shifters of the plurality of branches.

19. The full-duplex transceiver of claim 17 wherein each branch of the analog compensator is modeled by a respective transfer function, $U(f)$, to which a respective complex gain, $\beta$, of the plurality of complex gains, is applied.

20. The full-duplex transceiver of claim 19 wherein the respective transfer function, $U(f)$, is determined empirically.

21. The full-duplex transceiver of claim 19 wherein the tuner is configured to employ a least square technique to solve a system, formed by the plurality of branches of the analog compensator, for the plurality of complex gains in a frequency domain, wherein the system is of a form $u\beta=h$, wherein u is a discrete representation in the frequency domain of respective transfer functions for the plurality of branches, $\beta$ is the plurality of complex gains, and h is a discrete representation in the frequency domain of a quotient of the baseband self-interference signal divided by the baseband transmit signal.

22. The full-duplex transceiver of claim 21 wherein:
the plurality of complex gains includes N complex gains;
the plurality of branches includes N branches; and
the tuner is configured to use a set of K frequencies to form u and h.

23. The full-duplex transceiver of claim 22 wherein the transmit signal is an orthogonal frequency division multiplexed (OFDM) signal and the set of K frequencies includes subcarrier frequencies of the transmit signal.

24. The full-duplex transceiver of claim 17 wherein the tuner is configured to convert the baseband transmit signal and the baseband self-interference signal from a time domain to a frequency domain.

25. An analog compensation circuit for a multi-transmitter full-duplex transceiver having N transmitters and N transmit chains, comprising:

a secondary receiver configured to receive and convert N samples of an aggregate self-interference signal to N baseband self-interference signal samples;

a tuner coupled to the secondary receiver and configured to:

receive N baseband transmit signal samples from each of the N transmit chains, wherein a total of N×N baseband transmit signal samples are received, and compute a plurality of complex gains according to the N×N baseband transmit signal samples and the N baseband self-interference signal samples; and an analog compensator coupled to the tuner, having a plurality of branches, and configured to:

receive the plurality of complex gains, adjust respective attenuators and phase shifters of the plurality of branches using the plurality of complex gains, and process respective samples of N transmit signals from the N transmit chains using the plurality of branches, wherein the N transmit signals are respectively up-converted from N baseband transmit signals.

26. The analog compensation circuit of claim 25,
wherein N is two;
wherein the secondary receiver is further configured to respectively receive and convert first and second samples of the aggregate self-interference signal to first and second baseband self-interference signal samples;
wherein the tuner is further configured to:
receive respective first baseband transmit signal samples from first and second transmit chains and respective second baseband transmit signal samples from the first and second transmit chains, and
compute the plurality of complex gains according to the respective first baseband transmit signal samples, the respective second baseband transmit signal samples, and the first and second baseband self-interference signal samples; and
wherein the analog compensator is further configured to process respective samples of first and second transmit signals from the first and second transmit chains using the plurality of branches.

* * * * *

UNITED STATES PATENT AND TRADEMARK OFFICE
CERTIFICATE OF CORRECTION

| | | |
|---|---|---|
| PATENT NO. | : 9,136,883 B1 | Page 1 of 1 |
| APPLICATION NO. | : 14/464137 | |
| DATED | : September 15, 2015 | |
| INVENTOR(S) | : Michael Ligouri Moher | |

It is certified that error appears in the above-identified patent and that said Letters Patent is hereby corrected as shown below:

Claims

In Col. 10, line 48, claim 16, delete "amplitude do determine" and insert --amplitude to determine--.

Signed and Sealed this
Twenty-second Day of March, 2016

Michelle K. Lee
*Director of the United States Patent and Trademark Office*